US008897112B2

(12) United States Patent
Natsui

(10) Patent No.: US 8,897,112 B2
(45) Date of Patent: Nov. 25, 2014

(54) INFORMATION RECORDING/REPRODUCTION DEVICE, CLEANING TAPE, AND OPTICAL PICKUP CLEANING METHOD

(75) Inventor: Akinaga Natsui, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/131,638

(22) PCT Filed: Jun. 7, 2012

(86) PCT No.: PCT/JP2012/003739
§ 371 (c)(1),
(2), (4) Date: Jan. 8, 2014

(87) PCT Pub. No.: WO2013/011621
PCT Pub. Date: Jan. 24, 2013

(65) Prior Publication Data
US 2014/0140183 A1 May 22, 2014

(30) Foreign Application Priority Data

Jul. 15, 2011 (JP) ................................. 2011-156412

(51) Int. Cl.
*G11B 15/04* (2006.01)

(52) U.S. Cl.
USPC .......................................... 369/53.2; 369/72

(58) Field of Classification Search
None
See application file for complete search history.

(56) References Cited

U.S. PATENT DOCUMENTS 6,317,401 B1 * 11/2001 Masaki et al. .................. 369/71
6,711,102 B1 * 3/2004 Murakami et al. ......... 369/13.36

2005/0117493 A1 6/2005 Sueki et al.
2006/0096059 A1 * 5/2006 Watanabe ....................... 15/345
2008/0314407 A1 * 12/2008 Bruls et al. ......................... 134/1
2009/0092023 A1 * 4/2009 Horie et al. ..................... 369/72
2012/0291055 A1 * 11/2012 Mahnad ......................... 720/663

FOREIGN PATENT DOCUMENTS

| JP | 60-040537 A | 3/1985 |
| JP | 62-149042 A | 7/1987 |
| JP | 1-140482 A | 6/1989 |
| JP | 2005-166164 A | 6/2005 |
| JP | 2007-012126 * | 1/2007 |

OTHER PUBLICATIONS

International Search Report issued in International Application No. PCT/JP2012/003739 mailed Jul. 31, 2012, with English translation, 2 pgs.

* cited by examiner

*Primary Examiner* — Paul Huber
(74) *Attorney, Agent, or Firm* — McDermott Will & Emery LLP

(57) ABSTRACT

An information recording and reproduction device comprises an optical pickup that has an objective lens and records information to a tape-form medium or reproduces information from a tape-form medium using laser light; a tape threading component that allows the tape-form medium to be arranged opposite the objective lens; a controller that detects that the tape-form medium is a cleaning tape; a movement mechanism that operates so as to bring the tape-form medium and the objective lens into contact with each other, in response to the detection by the control unit; and a first drive mechanism that plays out the tape-form medium in a state in which the tape-form medium and the objective lens are in contact with each other. The information recording and reproduction device is capable of cleaning the optical pickup even with a tape-form medium.

7 Claims, 11 Drawing Sheets

INFORMATION RECORDING/REPRODUCTION DEVICE, CLEANING TAPE, AND OPTICAL PICKUP CLEANING METHOD

RELATED APPLICATIONS

This application is the U.S. National Phase under 35 U.S.C. §371 of International Application No. PCT/JP2012/003739, filed on Jun. 7, 2012, which in turn claims the benefit of Japanese Application No. 2011-156412, filed on Jul. 15, 2011, the disclosures of which are incorporated by reference herein.

TECHNICAL FIELD

The present invention relates to a tape-form information recording and reproduction device, and more particularly relates to the cleaning of an information recording and reading element (hereinafter referred to as an optical pickup).

BACKGROUND ART

In the past, there were known cleaning disks used in optical disk devices for the purpose of removing dirt from an optical pickup. With an optical disk device, the optical pickup and the medium do not come into contact with each other. Thus, a cleaning disk was used in which a three-dimensional object like a brush was disposed over the disk to brush away dirt (see Patent Literature 1, for example).

Meanwhile, as computers and the Internet have become increasingly pervasive in recent years, there has been an explosive increase in the amounts of data being handled, and there is a need for greater capacity of recording devices used for backup. Tape streamers that record and reproduce optical signals such as those from an optical disk to a tape-form medium are a prominent example of such large-capacity information recording and reproduction devices.

CITATION LIST

Patent Literature

Patent Literature 1: Japanese Laid-Open Patent Application S60-40537

SUMMARY

Technical Problem

A tape-form medium, however, has to be wound inside a cassette. Therefore, if a brush or other such protruding object is disposed over the tape, there is the risk that when the tape is wound, the protruding object will press against the tape and scratch the tape surface, or that the winding itself will be hampered.

Thus, with a tape streamer in which a tape-form medium was used, a brush or other such three-dimensional object could not be disposed over the tape, and an optical pickup could not be cleaned by employing a configuration in which a cleaning member and the objective lens of the optical pickup were brought into contact with each other.

The technology disclosed herein solves the above problem, and makes it possible to clean an optical pickup even with a tape-form medium.

Solution to Problem

To solve the above problem, according to one aspect of the technology disclosed herein, there is provided an information recording and reproduction device that optically records and reproduces information to and from a tape-form medium, the information recording and reproduction device comprising an optical pickup, a tape threading component, a controller, a movement mechanism, and a first drive mechanism. The optical pickup includes an objective lens and configured to record information to a tape-form medium or configured to reproduce information from a tape-form medium using laser light. The tape threading component is configured to allow the tape-form medium to be arranged opposite the objective lens. The controller is configured to detect that the tape-form medium is a cleaning tape. The movement mechanism is configured to operate so as to bring the tape-form medium and the objective lens into contact with each other, in response to the detection by the control unit. The first drive mechanism is configured to play out the tape-form medium in a state in which the tape-form medium and the objective lens are in contact with each other.

According to a second aspect, there is provided a cleaning tape configured to clean the objective lens of the optical pickup in the above-mentioned information recording and reproduction device by contact with the objective lens.

According to a third aspect, there is provided an optical pickup cleaning method for cleaning an objective lens using an information recording and reproduction device comprising an optical pickup including an objective lens and configured to optically record and reproduce information to and from a tape-form medium. The method comprises: detecting that the tape-form medium is a cleaning tape; arranging the tape-form medium opposite the objective lens; bringing the tape-form medium and the objective lens into contact with each other in response to the detection; and playing out the tape-form medium in a state in which the tape-form medium and the objective lens are in contact with each other.

Advantageous Effects

As discussed above, the technology disclosed herein makes it possible to clean an optical pickup even with a tape-form medium.

DESCRIPTION OF EMBODIMENTS

An embodiment of the present invention will be described through reference to the drawings.

1 Embodiment 1

1.1 Configuration of Information Recording and Reproduction Device 100

Figure 1:
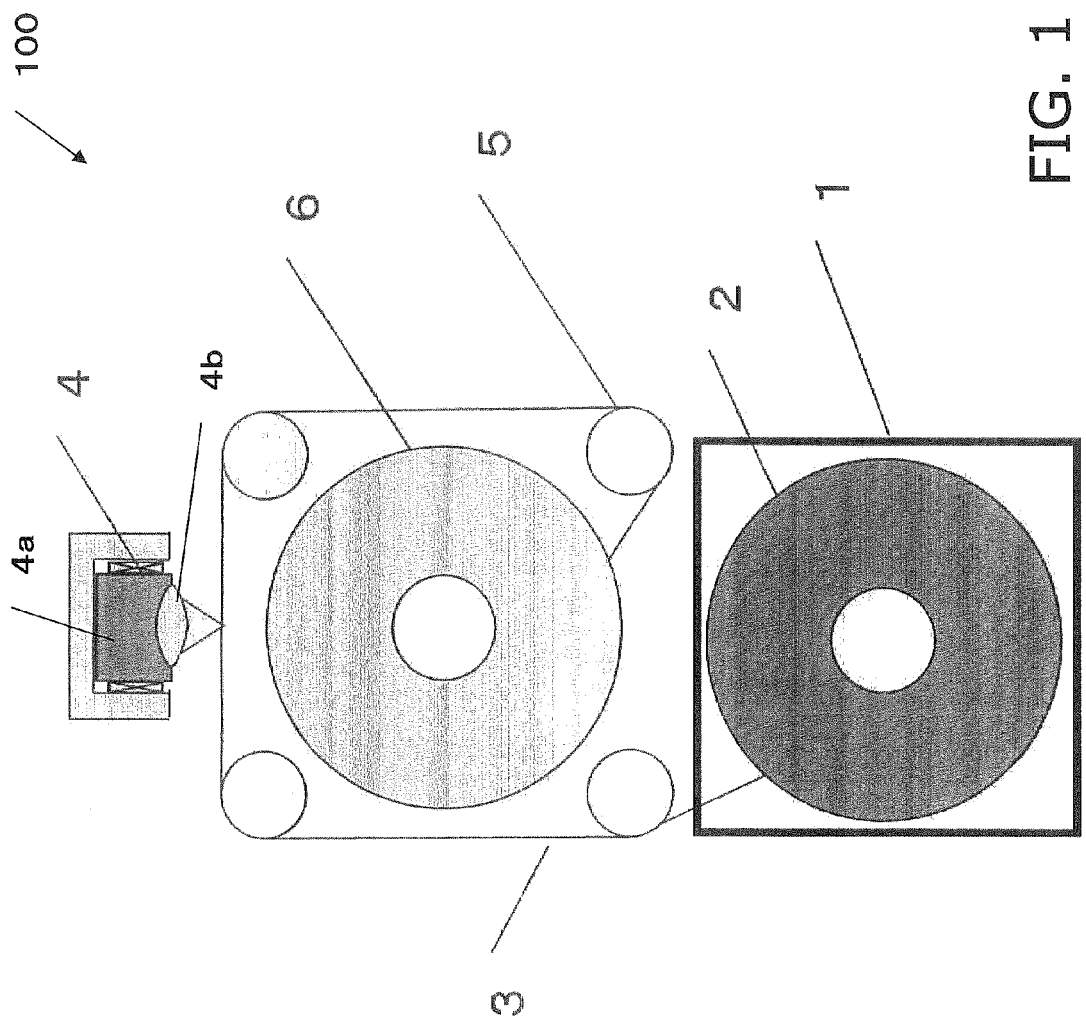
FIG. 1 is a simplified plan view showing an example of the information recording and reproduction device equipped with an optical pickup featuring a tape-form medium pertaining to Embodiment 1.
Figure 3:
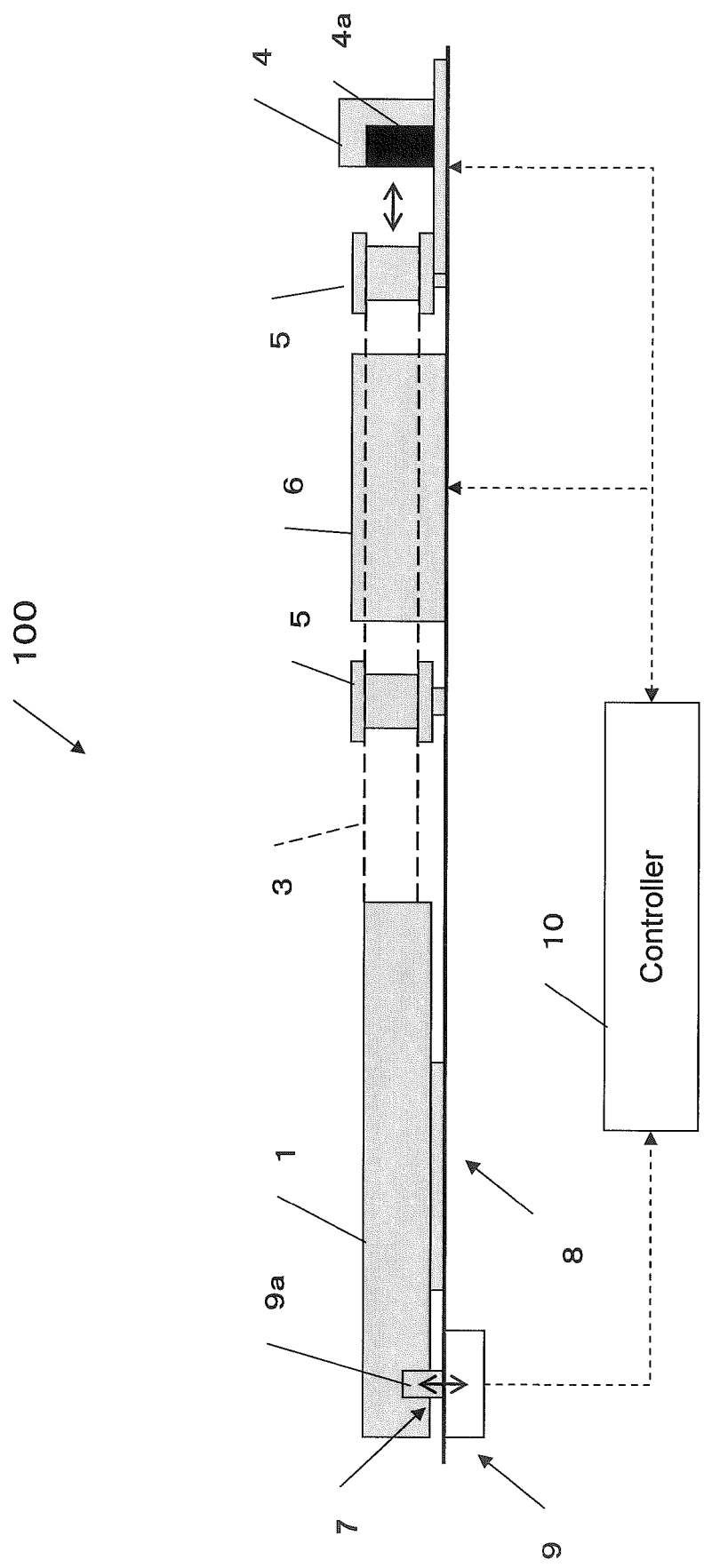
FIG. 3 is a simplified side view of the information recording and reproduction device.

FIG. 1 is a simplified diagram of an example of the information recording and reproduction device 100 pertaining to this embodiment. A tape-form medium capable of recording and reproducing information with an optical pickup is installed in the information recording and reproduction device 100. The information recording and reproduction device 100 (an example of an information recording and reproduction device) comprises an optical pickup 4 (an example of an optical pickup) having a focus control actuator 4a, an objective lens 4b (an example of an objective lens), and so forth, and a plurality of guide rollers 5, a takeup reel 6, and a cassette mounting component 8 (FIG. 3).

The optical pickup 4 is disposed so as to face the tape that is loaded onto the takeup reel 6 and played out between the guide rollers 5. The optical pickup 4 directs laser light from a laser light source (not shown) through the objective lens 4b and at the tape, and reproduces and records information from and to the tape. The optical pickup 4 also performs focus control by driving the focus control actuator 4a, etc. Furthermore, in this embodiment, as will be discussed below, the optical pickup 4 moves the focus control actuator 4a with respect to the tape to execute a cleaning operation.

As shown in FIG. 1, the guide rollers 5 are disposed so that the tape loaded to the takeup reel 6 is played out, supported, and guided by the guide rollers 5. The takeup reel 6 takes up the tape played out from the cassette.

The cassette mounting component 8 (FIG. 3) is the portion where the cassette is mounted, and has a detection mechanism 9 for detecting whether or not the mounted cassette is a cleaning cassette 1 (discussed below).

In normal recording and reproduction operation of the information recording and reproduction device 100, when a recording and reproduction tape cassette is mounted and the tape is installed on the takeup reel 6, the tape is played out by the rotation of the takeup reel 6 in response to user operation. Laser light is then emitted through the objective lens 4b of the optical pickup 4, and information on the tape is reproduced, or information is recorded to the tape.

Figure 2:
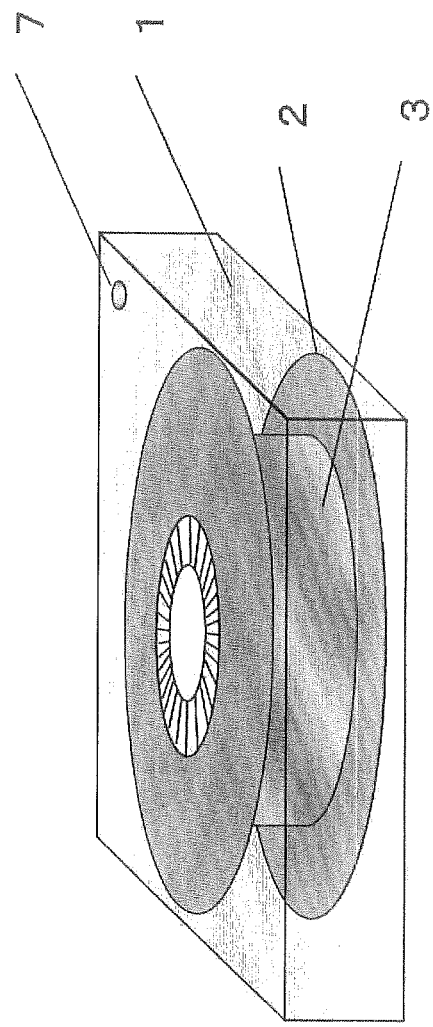
FIG. 2 is a simplified oblique view of an example of a cleaning cassette in Embodiment 1.

FIG. 2 is a simplified diagram showing an example of the cleaning cassette 1 used in this embodiment. The cleaning cassette 1 has a play-out reel 2 that is installed in the cleaning cassette 1 and on which a cleaning tape 3 (an example of a cleaning tape) is wound, and an identification hole 7 used for identifying the cassette as a cleaning cassette. The cleaning tape 3 is constituted by a nonwoven cloth.

The cleaning cassette 1 is similar to an ordinary tape used for recording and reproduction in that when it is mounted into a cassette mounting component of the information recording and reproduction device 100, and the tape is installed on the takeup reel 6, the tape is played out by the rotation of the takeup reel 6 in response to user operation. When the cleaning operation (discussed below) is complete, the tape is rewound by the rotation of the play-out reel 2.

FIG. 3 is a simplified side view of the information recording and reproduction device 100, and shows the state when the cleaning cassette 1 has been mounted. As shown in this drawing, the detection mechanism 9 is provided to the cassette mounting component 8 of the information recording and reproduction device 100. The detection mechanism 9 has a pin 9a designed so that it sticks up toward and recedes from the mounted cassette. The pin 9a is biased upward in the drawing (that is, toward the mounted cassette) by a spring or other such elastic member (not shown). The detection mechanism 9 includes, for example, an optical sensor, a contact sensor, etc., for detecting movement of the pin 9a, and thereby detecting whether or not the mounted cassette is the cleaning cassette 1. The information recording and reproduction device 100 further includes a controller 10. The controller 10 shown in FIG. 3 is only shown in conceptual form in order to facilitate description, and it may be provided at any position so long as it is provided to the information recording and reproduction device 100.

When the cleaning cassette 1 is mounted in the information recording and reproduction device 100, the pin 9a is inserted into the identification hole 7 of the cleaning cassette 1. In this case, since the pin 9a does not move, the detection mechanism 9 does not detect movement of the pin 9a for a specific length of time (such as a specific length of time since the mounting of the cassette was detected), and consequently sends a specific signal to the controller 10.

On the other hand, if an ordinary recording and reproduction tape cassette (not shown) is mounted, since an ordinary recording and reproduction tape cassette does not have an identification hole, the pin 9a will be pushed downward in the drawing (that is, away from the mounted cassette) by the mounted tape cassette, against its biasing. The detection mechanism 9 detects this movement of the pin 9a, and sends this detection signal to the controller 10.

This embodiment is not limited to the example given above. For instance, an identification hole may be provided to an ordinary recording and reproduction tape cassette, and not to the cleaning cassette 1.

Figure 4:
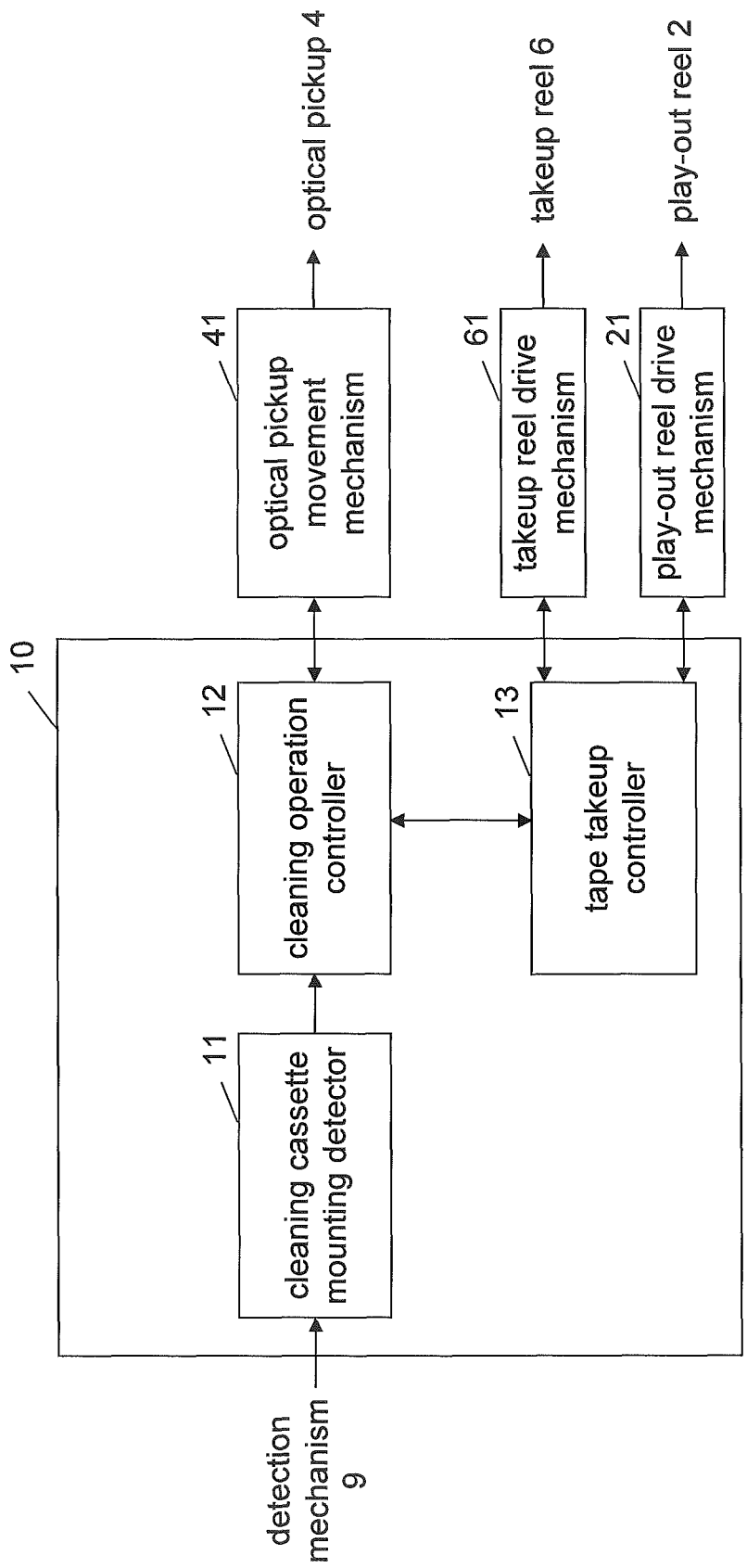
FIG. 4 is a function block diagram of a controller in the information recording and reproduction device.

FIG. 4 shows the configuration of the controller 10 for executing the cleaning operation pertaining to this embodiment. The controller 10 (an example of a controller) has a cleaning cassette mounting detector 11 that detects the mounting of a cleaning cassette in response to a signal from the detection mechanism 9, a cleaning operation controller 12 that issues control commands for executing the cleaning operation in response to a signal from the cleaning cassette mounting detector 11, and a tape takeup controller 13 that controls the tape takeup operation.

The cleaning cassette mounting detector 11 detects that the mounted cassette is the cleaning cassette 1 on the basis of a specific signal from the detection mechanism 9.

The cleaning operation controller 12 instructs an optical pickup movement mechanism 41 to move the optical pickup 4 in response to detection by the cleaning cassette mounting detector 11. More specifically, the cleaning operation controller 12 controls so that the optical pickup movement mechanism 41 will move the focus control actuator 4a of the optical pickup 4 closer to the cleaning tape 3. The cleaning operation controller 12 also instructs the optical pickup movement mechanism 41 to move the optical pickup in response to a signal from the tape takeup controller 13. More specifically, the cleaning operation controller 12 controls so that the optical pickup movement mechanism 41 will move the focus control actuator 4a away from the cleaning tape 3.

The tape takeup controller 13 drives a takeup reel drive mechanism 61 or a play-out reel drive mechanism 21 in response to a command signal from the cleaning operation controller 12 or operation by the user, and thereby rotates the takeup reel 6 or the play-out reel 2. The tape takeup controller 13 also notifies the cleaning operation controller 12 of the stoppage of drive of the takeup reel (completion of tape play-out) in response to a command signal from the takeup reel drive mechanism 61 or operation by the user.

Figure 6A:
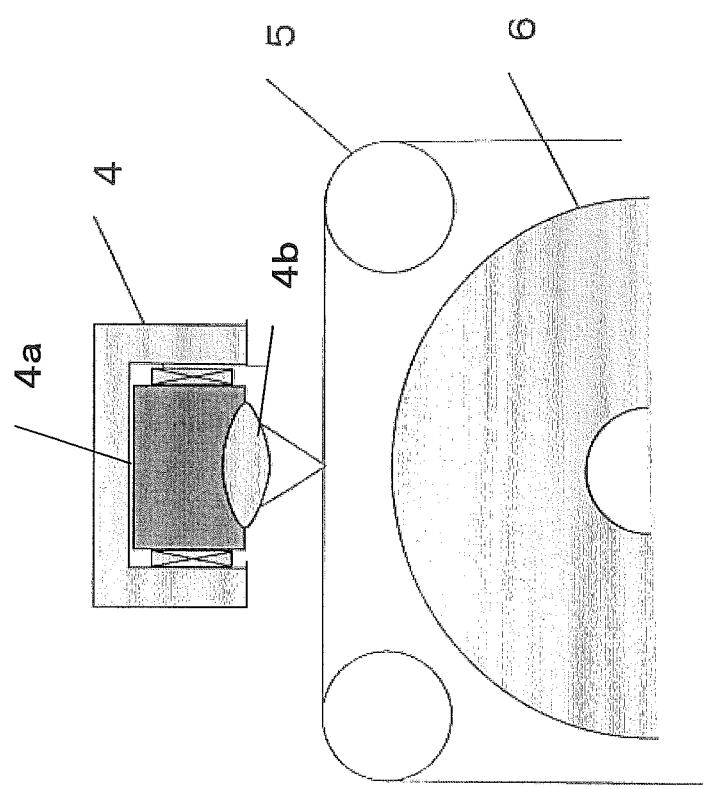
FIG. 6A is a diagram of the layout of the optical pickup during recording and reproducing to and from a tape-form medium in Embodiment 1.

The optical pickup movement mechanism 41 (an example of a movement mechanism) moves the optical pickup 4 in response to a command signal from the cleaning operation controller 12. More specifically, as shown in FIG. 6A, the focus control actuator 4a of the optical pickup 4 is designed to be able to move toward and away from the cleaning tape 3 supported by the guide rollers 5.

The takeup reel drive mechanism 61 (an example of a first drive mechanism) rotates the takeup reel 6 in the direction of playing out the tape (here, the direction in which the tape of the cassette is wounded onto the takeup roller 6) in response to a command signal from the tape takeup controller 13.

The play-out reel drive mechanism 21 (an example of a second drive mechanism) rotates the play-out reel 2 in the direction of rewinding the tape (here, the direction in which the tape of the takeup reel 6 is wound onto the play-out reel 2) in response to a command signal from the tape takeup controller 13.

The controller 10 includes a CPU and a memory that holds programs, etc., and executes the operations by the various components discussed above. The controller 10 may also include programs for executing other operational processing of the information recording and reproduction device 100 (such as information recording and reproduction operations).

1.2 Cleaning Operation with Information Recording and Reproduction Device 100

Figure 5:
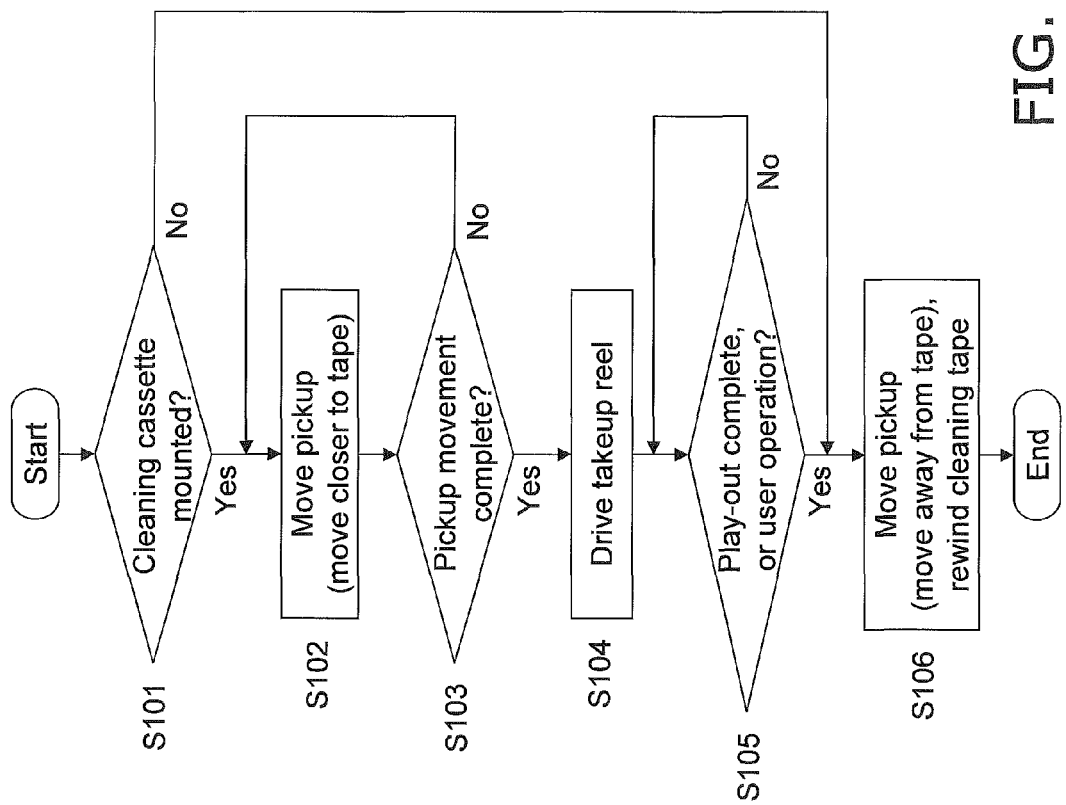
FIG. 5 is a flowchart showing the processing performed by the controller of the information recording and reproduction device pertaining to Embodiment 1.

The cleaning of the optical pickup 4 is performed, for example, when information cannot be properly recorded or reproduced in the information recording and reproduction device 100. Upon receiving a cleaning prompt or the like from the information recording and reproduction device 100, the user mounts the cleaning cassette 1 in the information recording and reproduction device 100. FIG. 5 shows the processing performed mainly by the controller 10 after the cassette has been mounted and until the cleaning operation is performed.

Step S101: As discussed above, when the detection mechanism 9 has detected the identification hole 7 provided to the cleaning cassette 1, a specific signal is sent from the detection mechanism 9, and the cleaning cassette mounting detector 11 detects that the cleaning cassette 1 has been mounted.

The information recording and reproduction device 100 loads the cleaning tape 3 up to the takeup reel 6 after the cleaning cassette 1 has been installed.

Figure 6B:
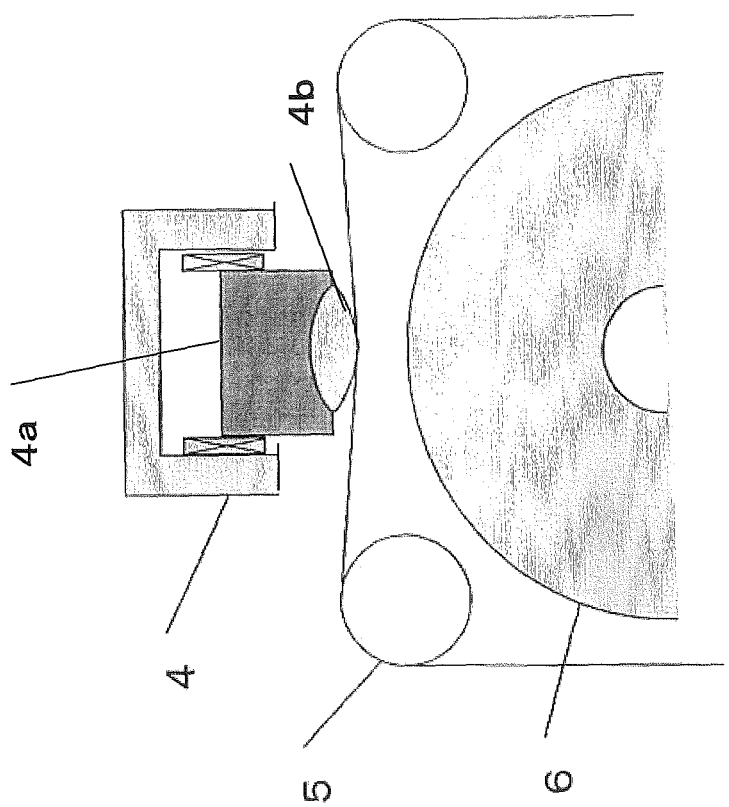
FIG. 6B is a diagram of the layout of the optical pickup during the cleaning of a tape-form medium in Embodiment 1.

Step S102: The cleaning operation controller 12 drives the optical pickup movement mechanism 41 in response to detection by the cleaning cassette mounting detector 11. More specifically, the focus control actuator 4a moves toward the cleaning tape 3 up to the position shown in FIG. 6B. The objective lens 4b then sticks out from the focus control actuator 4a and comes into contact with the cleaning tape 3, which is made of a nonwoven cloth. At this point it is preferable for the cleaning tape 3 to be bent somewhat by contact with the objective lens 4b. This increases the contact area between the objective lens 4b and the cleaning tape 3, so the cleaning of the objective lens 4b is performed more effectively.

Step S103: The cleaning operation controller 12 detects movement of the focus control actuator 4a by the optical pickup movement mechanism 41. The cleaning operation controller 12 stops the movement if it detects that the focus control actuator 4a has reached the position shown in FIG. 6B.

Step S104: The tape takeup controller 13 starts playing out the tape by driving the takeup reel drive mechanism 61 and rotationally driving the takeup reel 6. This rotational drive may be started by a user operation, or it may be automatically started when the cleaning operation controller 12 detects movement of the focus control actuator 4a in step S103. As a result of this play-out operation, the cleaning tape 3 is played out while in contact with the objective lens 4b, and the surface of the objective lens 4b is rubbed clean.

Step S105: The cleaning operation controller 12 determines from a signal from the tape takeup controller 13 whether the play-out of the tape is complete, or the tape play-out has stopped in the middle of takeup due to a user operation.

Step S106: If the tape play-out is complete, or if the tape play-out has stopped, the optical pickup movement mechanism 41 is driven in response to a command signal from the cleaning operation controller 12. More specifically, the focus control actuator 4a moves away from the cleaning tape 3 to the position shown in FIG. 6A. At this point, the tape takeup controller 13 rotationally drives a play-out reel drive mechanism 21 in response to a command signal from the cleaning operation controller 12, and the cleaning tape 3 that was temporarily wound onto the takeup reel 6 is rewound onto the play-out reel 2. An operation to eject the cleaning cassette 1 is then performed as a result of user operation, which completes the cleaning operation.

1.3 Features of Embodiment 1

As discussed above, with the information recording and reproduction device 100 in this embodiment, the controller 10 detects that the tape is the cleaning tape 3, and in response to this detection, moves the optical pickup movement mechanism 41 until the cleaning tape 3 and the objective lens 4b come into contact with each other. Then the cleaning tape 3 is played out by the takeup reel drive mechanism 61 in a state in which the cleaning tape 3 and the objective lens 4b are in contact with each other, to perform the cleaning operation. Consequently, there is no need for a brush or other such three-dimensional object to be provided over the cleaning tape. Therefore, the optical pickup 4 can be cleaned even with a cleaning tape having no protruding object on the lens side.

2 Embodiment 2

Figure 7A:
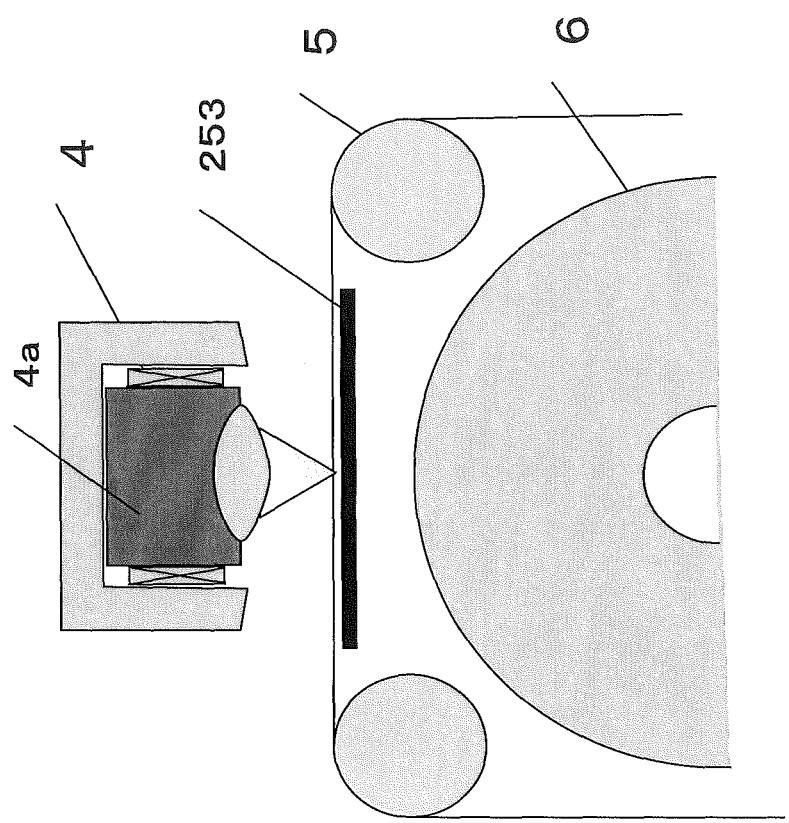
FIG. 7A is a diagram of the layout of an optical pickup during recording and reproducing to and from a tape-form medium in Embodiment 2.
Figure 7B:
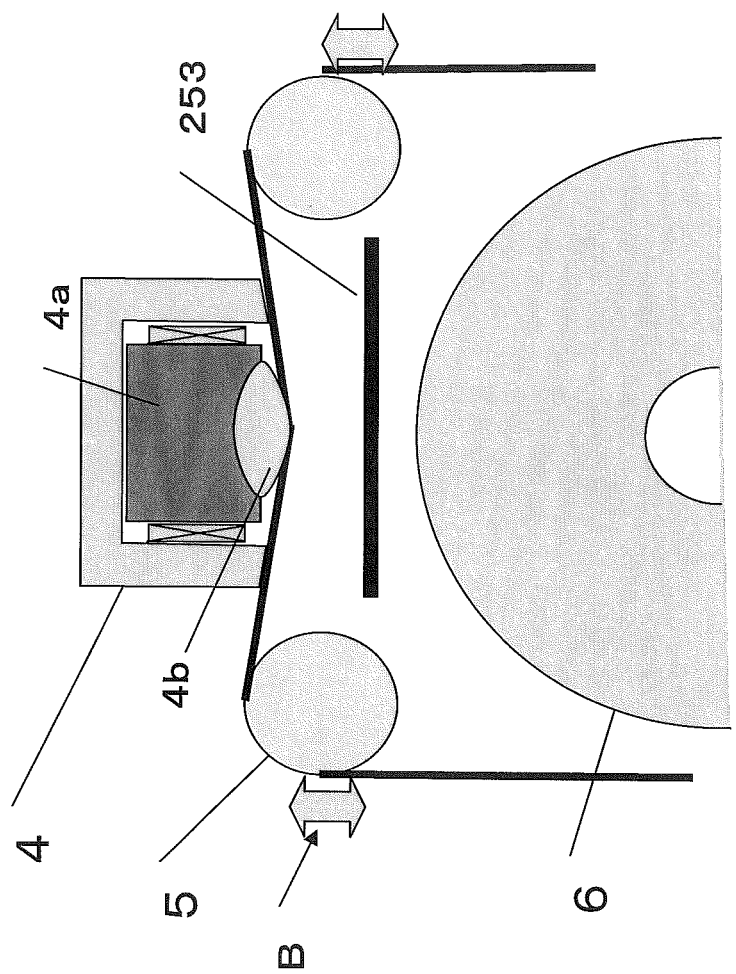
FIG. 7B is a diagram of the layout of optical pickup during the cleaning of a tape-form medium in Embodiment 2.

The cleaning operation performed with the information recording and reproduction device pertaining to Embodiment 2 will now be described. As shown in FIGS. 7A and 7B, Embodiment 2 differs from Embodiment 1 in that there is a mechanism for moving not the optical pickup, but moving guide rollers supporting the tape that faces the optical pickup, toward the optical pickup.

In the following description, those components and functions that are the same as in Embodiment 1 will not be described again in detail, and will be referred to by the same numbers in the same drawings. The information recording and reproduction device pertaining to Embodiment 2 has the same configuration as the information recording and reproduction device 100 shown in FIGS. 1 to 3, but differs in that it does not comprise an optical pickup movement mechanism, and instead comprises a guide roller movement mechanism.

2.1 Configuration of Information Recording and Reproduction Device 100

Figure 8:
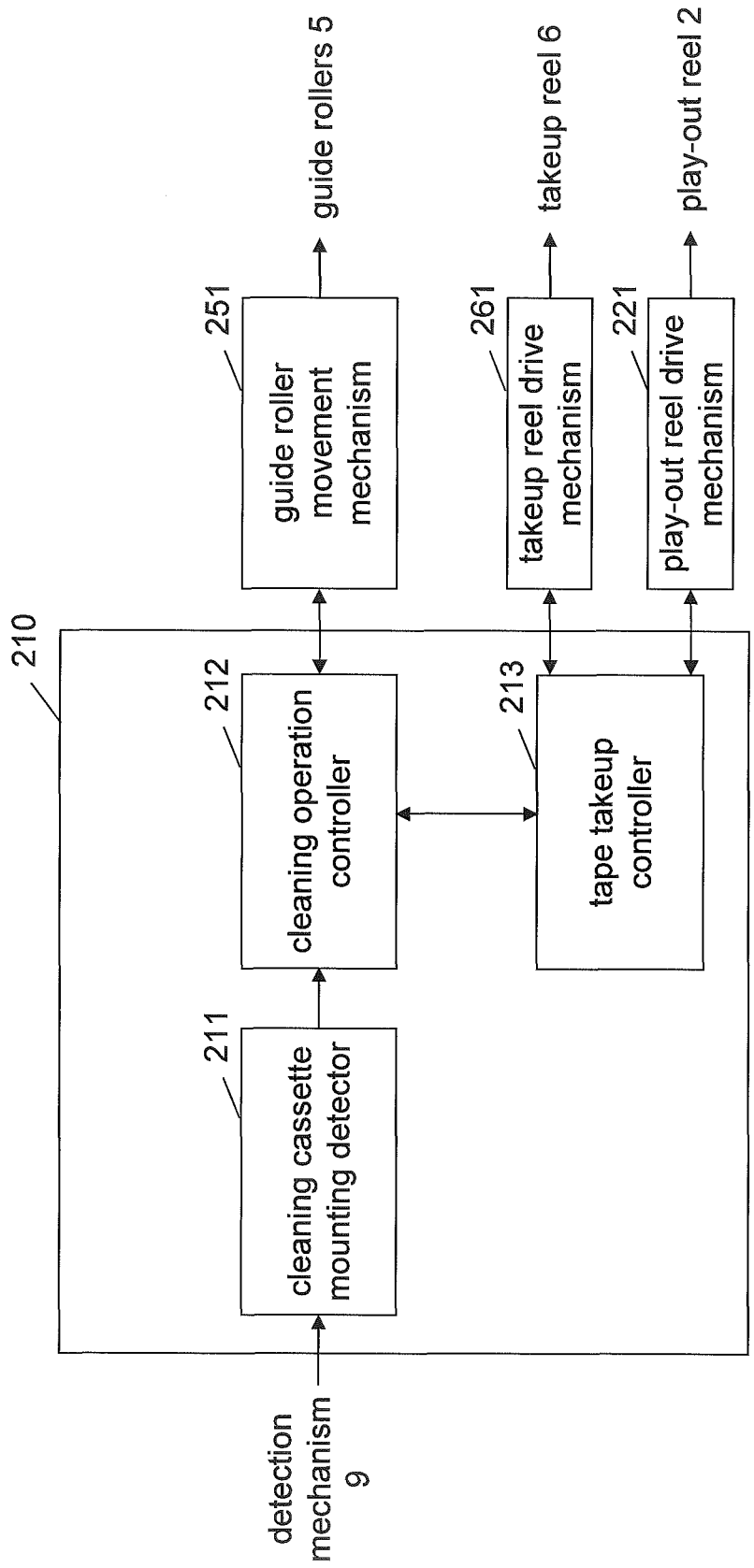
FIG. 8 is a function block diagram of a controller in the information recording and reproduction device.

FIG. 8 shows the configuration of a controller 210 for executing the cleaning operation pertaining to this embodiment. The controller 210 (an example of a controller) has a cleaning cassette mounting detector 211 that detects the mounting of a cleaning cassette in response to a signal from the detection mechanism 9, a cleaning operation controller 212 that issues control commands for executing the cleaning operation in response to a signal from the cleaning cassette mounting detector 211, and a tape takeup controller 213 that controls the tape takeup operation.

The cleaning cassette mounting detector 211 detects that the mounted cassette is the cleaning cassette 1 on the basis of a specific signal from the detection mechanism 9.

The cleaning operation controller 212 instructs a guide roller movement mechanism 251 (an example of a movement mechanism) to move the guide rollers 5 in response to detection by the cleaning cassette mounting detector 211. The guide roller movement mechanism 251 may be a mechanism that moves at least the guide rollers in positions facing the optical pickup 4 out of the plurality of guide rollers 5 (two of them as shown in FIGS. 7A and 7B). More specifically, the cleaning operation controller 212 controls so that the guide roller movement mechanism 251 will move two of the guide rollers 5 (an example of a tape threading component), which support the cleaning tape 3 and face the optical pickup 4, closer to the optical pickup 4, as shown in FIG. 7B. As shown in FIG. 7B, this movement brings the objective lens 4b of the optical pickup 4 into contact with the cleaning tape 3, which is made of a nonwoven cloth.

As shown in FIGS. 7A and 7B, a guide plate 253 (a heat dispersing plate, for example) for guiding the tape may be provided between the two guide rollers 5, with the tape in between, and on the opposite side from the optical pickup 4. In the cleaning operation, the guide plate 253 is not moved, and only the guide rollers 5 are moved, so that the objective lens 4b does not hit the guide plate 253 after the guide roller movement.

The cleaning operation controller 212 instructs the guide roller movement mechanism 251 to move the guide rollers 5 in response to a signal from the tape takeup controller 213. More specifically, the cleaning operation controller 212 controls so that the guide roller movement mechanism 251 moves the guide rollers 5 away from the cleaning tape 3.

The tape takeup controller 213 drives a takeup reel drive mechanism 261 or a play-out reel drive mechanism 221 in response to a command signal from the cleaning operation controller 212 or operation by the user, and thereby rotates the takeup reel 6 or the play-out reel 2. The tape takeup controller 213 also notifies the cleaning operation controller 212 of the stoppage of drive of the takeup reel (completion of tape play-out) in response to a command signal from the takeup reel drive mechanism 261 or operation by the user.

The guide roller movement mechanism 251 includes a sliding mechanism, for example, and moves the guide rollers 5 in response to a command signal from the cleaning operation controller 212. More specifically, the two guide rollers 5 supporting the cleaning tape 3 and facing the optical pickup 4 are moved closer to the optical pickup 4.

The takeup reel drive mechanism 261 (an example of a first drive mechanism) rotates the takeup reel 6 in the direction of playing out the tape (here, the direction in which the tape of the cassette is wounded onto the takeup reel 6) in response to a command signal from the tape takeup controller 213.

The play-out reel drive mechanism 221 (an example of a second drive mechanism) rotates the play-out reel 2 in the direction of rewinding the tape (here, the direction in which the tape of the takeup reel 6 is wound onto the play-out reel 2) in response to a command signal from the tape takeup controller 213.

The controller 210 includes a CPU and a memory that holds programs, etc., and executes the operations by the various components discussed above. The controller 210 may also include programs for executing other operational processing of the information recording and reproduction device 100 (such as information recording and reproduction operations).

2.2 Cleaning Operation with Information Recording and Reproduction Device 100

Figure 9:
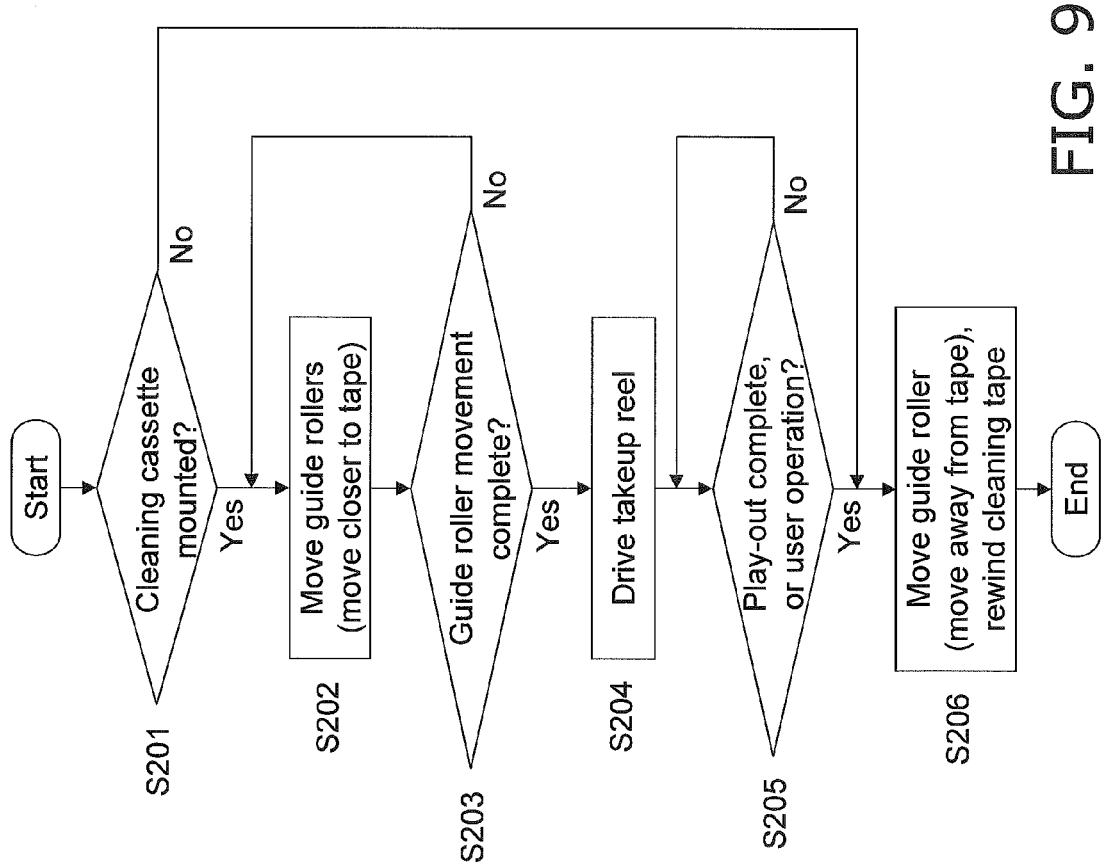
FIG. 9 is a flowchart of the processing performed by the controller of the information recording and reproduction device.

FIG. 9 shows the processing performed mainly by the controller 210 after the cassette has been mounted and until the cleaning operation is performed.

Step S201: Just as in Embodiment 1, when the detection mechanism 9 has detected the identification hole 7 provided to the cleaning cassette 1, a specific signal is sent from the detection mechanism 9, and the cleaning cassette mounting detector 211 detects that the cleaning cassette 1 has been mounted.

The information recording and reproduction device 100 loads the cleaning tape 3 up to the takeup reel 6 after the cleaning cassette 1 has been installed.

Step S202: The cleaning operation controller 212 drives the guide roller movement mechanism 251 in response to detection by the cleaning cassette mounting detector 211. More specifically, the two guide rollers 5 are moved closer to the cleaning tape 3 up to the position shown in FIG. 6B. The objective lens 4b of the optical pickup 4 then comes into contact with the cleaning tape 3, which is made of a nonwoven cloth. At this point it is preferable for the cleaning tape 3 to be bent somewhat by contact with the objective lens 4b. This increases the contact area between the objective lens 4b and the cleaning tape 3, so the cleaning of the objective lens 4b is performed more effectively.

Step S203: The cleaning operation controller 212 detects movement of the guide rollers 5 by the guide roller movement mechanism 251. The cleaning operation controller 212 stops the movement if it detects that the guide rollers 5 have reached the position shown in FIG. 6B.

Step S204: The tape takeup controller 213 starts playing out the tape by driving the takeup reel drive mechanism 261 and rotationally driving the takeup reel 6. This rotational drive may be started by a user operation, or it may be automatically started when the cleaning operation controller 212 detects movement of the guide rollers 5 in step S203. As a result of this play-out operation, the cleaning tape 3 is played out while in contact with the objective lens 4b, and the surface of the objective lens 4b is rubbed clean.

Step S205: The cleaning operation controller 212 determines from a signal from the tape takeup controller 213 whether the play-out of the tape is complete, or the tape play-out has stopped in the middle of takeup due to a user operation.

Step S206: If the tape play-out is complete, or if the tape play-out has stopped, the guide roller movement mechanism 251 is driven in response to a command signal from the cleaning operation controller 212. More specifically, the guide rollers 5 move away from the cleaning tape 3 to the position shown in FIG. 7A. At this point, the tape takeup controller 213 rotationally drives the play-out reel drive mechanism 221 in response to a command signal from the cleaning operation controller 212, and the cleaning tape 3 that was temporarily wound onto the takeup reel 6 is rewound onto the play-out reel 2. An operation to eject the cleaning cassette 1 is then performed as a result of user operation, which completes the cleaning operation.

2.3 Features of Embodiment 2

As discussed above, with the information recording and reproduction device 100 pertaining to this embodiment, the controller 210 performs a cleaning operation by detecting that the tape is the cleaning tape 3, moving the guide roller movement mechanism 251 in response to this detection until the cleaning tape 3 and the objective lens 4b come into contact with each other, and playing out the cleaning tape 3 with the takeup reel drive mechanism 261 in a state in which the cleaning tape 3 and the objective lens 4b are in contact with each other. Consequently, there is no need to provide a brush or other such three-dimensional object over the cleaning tape. Therefore, the optical pickup 4 can be cleaned even with the cleaning tape 3 that has no protruding object on the lens side.

Also, in this embodiment, even when the guide plate 253 (such as a heat dispersing plate) for guiding the tape is provided on the opposite side from the optical pickup 4 with the tape in between, the guide plate 253 is not moved, and only the guide rollers 5 are moved in the cleaning operation. Consequently, the objective lens 4b does not hit the guide plate 253 after guide roller movement, so this prevents the objective lens 4b of the optical pickup 4 from being scratched during the cleaning operation.

2.4 Modification Example of Embodiment 2

In the above embodiment, the guide roller movement mechanism 251 has a configuration in which two guide rollers 5 supporting the cleaning tape 3 and facing the optical pickup 4 are moved closer to the optical pickup 4, but this is not the only option. For example, the configuration may be such that other guide rollers 5 supported the cleaning tape 3 are also slid, or may be such that all or part of the takeup reel 6 mounting portion or the cassette mounting portion is slid.

3 Other Embodiments

Embodiments 1 and 2 were described above, but the present invention is of course not limited to the above embodiments, and modifications can be made without departing from the gist of the invention. For example, the following variations are possible.

In the above embodiments, an information recording and reproduction device having a single optical pickup was described, but there may be two or more optical pickups, and there is no limit to the number of channels or tracks.

Also, nonwoven cloth was used as the material of the cleaning tape 3, but this is not the only option, and polishing tape or some other cleaning product may be used.

Also, an identification hole was used to identify the cleaning cassette 1, but this is not the only option, and some other identification method may be used, such as identification based on a signal from a memory in cassette, or identification based on identification information that can be read optically. Alternatively, a cleaning cassette may be identified by information input by user operation.

In the above embodiments, cleaning was performed by mounting the cleaning cassette 1, but this is not the only option. For example, a cleaning tape portion of a specific length may be formed at the play-out start or end of an ordinary tape used for recording and reproduction, and cleaning may be performed before or after performing the ordinary recording and reproduction operation. In this case, for example, the focus control actuator 4a or the guide rollers 5 may be moved just as in the above embodiments after detection of the cleaning tape portion on the optical pickup 4 side.

Also, the information recording and reproduction device 100 may employ both Embodiment 1 and Embodiment 2. That is, the information recording and reproduction device 100 may comprise both a movement mechanism for the optical pickup 4 and the guide roller movement mechanism 251.

INDUSTRIAL APPLICABILITY

The present invention is useful, for example, in the cleaning of an optical pickup of an information recording and reproduction device applied to a tape streamer for backing up data from a server or some other devices. It is also useful as cleaning tapes.

REFERENCE SIGNS LIST 1 cleaning cassette
2 play-out reel
3 cleaning tape (an example of a cleaning tape)
4 optical pickup (an example of an optical pickup)
4a focus control actuator
4b objective lens (an example of an objective lens)
5 guide roller (an example of a tape threading component)
6 takeup reel
7 identification hole
8 cassette mounting component
9 detection mechanism
10 controller (an example of a controller)
11 cleaning cassette mounting detector
12 cleaning operation controller
13 tape takeup controller
21 play-out reel drive mechanism (an example of a second drive mechanism)
41 optical pickup movement mechanism (an example of a movement mechanism)
61 takeup reel drive mechanism (an example of a first drive mechanism)
210 controller (an example of a controller)
211 cleaning cassette mounting detector
212 cleaning operation controller
213 tape takeup controller
221 play-out reel drive mechanism (an example of a second drive mechanism)
251 guide roller movement mechanism (an example of a movement mechanism)
253 guide plate
261 takeup reel drive mechanism (an example of a first drive mechanism)

What is claimed:

1. An information recording and reproduction device that optically records and reproduces information to and from a tape-form medium, said information recording and reproduction device comprising:

a tape path;
an optical pickup including an objective lens, the optical pickup being configured to record information to a tape-form medium or configured to reproduce information from a tape-form medium using laser light;
a tape threading component forming the tape path and configured to allow the tape-form medium to be arranged on the tape path opposite the objective lens;
a controller configured to detect whether or not the tape-form medium is a cleaning tape;
a movement mechanism configured to move the tape path or the objective lens between a first position and a second position, the first position being a position that the tape-form medium and the objective lens are in contact with each other, and the second position being a position that the tape-form medium and the objective lens are separated and positioned so that the information recording and reproduction device can record and reproduce information to and from the tape-form medium; and
a drive mechanism configured to run the tape-form medium on the tape path in a state in which the tape-form medium and the objective lens are in the first position when the controller has detected that the tape-form medium is a cleaning tape, the drive mechanism being configured to run the tape-form medium on the tape path in a state in which the tape-form medium and the objective lens are in the second position when the controller has detected that the tape-form medium is not a cleaning tape.

2. The information recording and reproduction device according to claim 1, wherein the movement mechanism is configured to bring the tape-form medium and the objective lens into contact with each other by moving the objective lens.

3. The information recording and reproduction device according to claim 1, wherein the movement mechanism is configured to bring the tape-form medium and the objective lens into contact with each other by moving the tape threading component.

4. The information recording and reproduction device according to claim 1, wherein the movement mechanism is configured to bring the tape-form medium and the objective lens into contact with each other until the tape-form medium bends under contact with the objective lens along a curved surface of the objective lens.

5. A cleaning tape configured to clean the objective lens of the optical pickup in the information recording and reproduction device according to claim 1 by contact with the objective lens.

6. The cleaning tape according to claim 5, wherein a material of at east a tape surface of the cleaning tape is formed from a nonwoven cloth.

7. An optical pickup cleaning method for cleaning an objective lens by using an information recording and reproduction device comprising an optical pickup including the objective lens and configured to optically record and reproduce information to and from a tape-form medium, said optical pickup cleaning method comprising:

arranging the tape-form medium opposite the objective lens and forming a tape path;

detecting whether or not the tape-form medium is a cleaning tape;

when having detected that the tape-form medium is a cleaning tape, moving the tape path or the objective lens to a first position, the first position being a position that the tape-form medium and the objective lens are in contact with each other;

when having detected that the tape-form medium is not a cleaning tape, moving the tape path or the objective lens to a second position, the second position being a position that the tape-form medium and the objective lens are separated and positioned so that the information recording and reproduction device can record and reproduce information to and from the tape-form medium;

running the tape-form medium on the tape path in a state in which the tape-form medium and the objective lens are in the first position; and running the tape-form medium on the tape path in a state in which the tape-form medium and the objective lens are in the second position.

\* \* \* \* \*